United States Patent [19]

Sinclair

[11] Patent Number: 5,459,329
[45] Date of Patent: Oct. 17, 1995

[54] VIDEO BASED 3D TACTILE RECONSTRUCTION INPUT DEVICE HAVING A DEFORMABLE MEMBRANE

[75] Inventor: Michael J. Sinclair, Atlanta, Ga.

[73] Assignee: Georgia Tech Research Corporation, Atlanta, Ga.

[21] Appl. No.: 306,160

[22] Filed: Sep. 14, 1994

[51] Int. Cl.$^6$ .................................................. G01N 21/86
[52] U.S. Cl. .............................. 250/559.29; 250/341.8; 250/358.1
[58] Field of Search ............................ 250/561, 227.24, 250/341.8, 358.1, 330–334; 356/376, 377; 382/25, 26; 128/654, 656; 378/207

[56] References Cited

U.S. PATENT DOCUMENTS

| | | | |
|---|---|---|---|
| 3,594,583 | 7/1971 | Sheldon | 250/214 VT |
| 4,405,197 | 9/1983 | Bejezy | 385/15 |
| 4,599,908 | 7/1986 | Sheridan et al. | 73/862.046 |
| 4,733,068 | 3/1988 | Thiele et al. | 250/227.14 |
| 5,225,959 | 7/1993 | Stearns | 361/283.1 |

Primary Examiner—Edward P. Westin
Assistant Examiner—Que T. Le
Attorney, Agent, or Firm—Hopkins & Thomas

[57] ABSTRACT

A tactile image mapper has a vessel with a deformable membrane on one side and a clear face plate on the other side. The vessel is filled with an optically dense material, such as ink, and a pressure regulator varies and measures the pressure of the optically dense material to cause the deformable membrane to assume the shape of an object to be tactually sensed. A ring illuminator shines light through the clear face plate to the back side of the deformable membrane and a video camera captures the reflections off of the back side of the deformable membrane. A microcomputer captures a frame from the video signal and interprets areas with high intensities in the frame as protrusions on the surface of the object and areas with low intensities in the frame as low areas on the object. Based upon the interpretations at each point within the frame of the video signal, the tactile image mapper reconstructs a high resolution synthesized three dimensional topographical image of the object.

17 Claims, 5 Drawing Sheets

VIDEO BASED 3D TACTILE RECONSTRUCTION INPUT DEVICE HAVING A DEFORMABLE MEMBRANE

FIELD OF INVENTION

This invention relates to an imaging system and, more particularly, to a tactile imaging system for synthesizing a three dimensional topographical image of an object.

BACKGROUND OF THE INVENTION

In numerous areas of technology, such as robotics or medicine, for example, it is often desirable or necessary to topographically map an object or a part of the body, and such mapping is often achieved through some sort of tactile responsive imaging system. One type of conventional tactile sensor that is used to determine a location or, more specifically, the shape of an object comprises an array of conductors separated from a second array of conductors by a dielectric. For instance, in U.S. Pat. No. 4,549,093 of Severwright and in U.S. Pat. No. 5,055,838 of Wise et al., an array of column conductors is separated from an array of row conductors by a dielectric and a two dimensional shape of an object is determined according to the locations at which the row conductors contact the column conductors or where the capacitance between conductors varies. In U.S. Pat. No. 5,225,959 of Stearns, a tactile sensor comprises an array of sensor capacitors that produces outputs corresponding to the pressure applied at each of the capacitive sensors by apparently varying the magnitude of each capacitance in proportion to the magnitude of the pressure.

Another type of tactile sensor, such as disclosed in U.S. Pat. No. 4,405,197 of Bejczy and in U.S. Pat. No. 4,733,068 of Thiele et al., uses an array of transmitting optical fibers and an array of receiving optical fibers to determine a location or shape of an object. An object coming in contact with this type of sensor varies the amount of light carried by the receiving optical fiber, whereby a shape of the object may be determined.

A third type of tactile sensor has a plurality of passages through which a signal medium, such as air, is conducted. When an object comes in contact with this type of sensor, a two dimensional shape of the object may be determined by monitoring the amounts of the signal medium flowing through the passages. The tactile sensor in U.S. Pat. No. 4,306,148 of Ringwall et al. and the opto-mechanical touch sensor in U.S. Pat. No. 4,599,908 of Sheridan et al. are examples of this type of sensor.

Many of the conventional tactile sensors as discussed in the foregoing, however, suffer from a disadvantage in that they are incapable of producing a high resolution image of an object or sensing surface topography more than a few millimeters deep. For the most part, the resolution of these sensors is dependent upon the number of elements making up the sensor, and generally it is not possible to have in a given area, enough elements to produce high resolution. Further, many of these tactile sensors can only determine the location of an object or produce, with proper processing, a two dimensional image of an object and are incapable of producing a synthesized three dimensional image of the object. By "synthesized three dimensional" is meant a perspective rendition of an image on a two dimensional screen such that the width, height, and depth of the image can be observed.

For example, the tactile sensor in the Ringwall et al. patent is used in the field of robotics for determining the magnitude of a force. During operation of this tactile sensor, the air flow in each passage deflects a metallic tab whose angular displacement is related to the magnitude of a force acting on the sensor. A light beam is directed onto the metallic tab and the quantity of light deflected off of the metallic tab represents the magnitude of the force. U.S. Pat. No. 4,982,611 of Lorenz et al., U.S. Pat. No. 5,010,773 of Lorenz et al., and U.S. Pat. No. 5,261,266 of Lorenz et al. disclose the use of strain gauges on a robotic hand to determine certain forces and torques.

The prior art sensors for use in robotics, however, are typically used to determine the magnitude of forces or torques and are incapable of producing a high resolution image of an object or sensing surface topography more than a few millimeters deep. As a result, the end-effectors in robotics cannot easily determine the position of an object nor easily identify an object. Therefore, for example, when robotics are used to assist in a manufacturing process, only a single type of part is typically delivered to the end-effectors with the position and timing of the part's delivery accurately controlled. Thus, there is a need in the art for a tactile image mapper that may be used in robotics to acquire a high resolution topographical image of an object which would enable the end-effectors to identify an object and determine the positioning of the object.

Another disadvantage of conventional tactile sensors discussed is the lack of conforming compliance due to the thinness of the sensing layer where only small surface displacements can be sensed. In medical applications, there is a need to sense surface displacements up to a few centimeters.

SUMMARY OF THE INVENTION

It is a general object of the invention to overcome the disadvantages of the prior art image mapping arrangements.

It is an object of the present invention to achieve tactile image mapping which provides a high resolution synthesized three dimensional image of an object.

Additional objects, advantages and novel features of the invention are set forth in the description which follows, and will become readily apparent to those skilled in the art.

To achieve the foregoing and other objects, in accordance with the present invention, in a preferred embodiment thereof, a tactile image mapper comprises a vessel for holding a light attenuating material, preferably a fluid. One exterior surface of the vessel is a membrane that deforms to a shape of an object when pressed against it, on one side and another exterior surface is a clear face plate located on an opposite side from the membrane. The inside surface of the deformable membrane, which is preferably opaque and light reflecting, is uniformly illuminated by a light and a camera, such as a video camera, detects and images reflections from the inside reflecting surface of the deformable membrane. Inasmuch as the intensity of the reflected light varies in accordance with distance traveled through the light attenuating medium, the deformation of its membrane is accurately recorded by the camera. Video signals from the video camera are supplied to a processor which captures a single frame or a timed sequence of the video signal and converts the frame into a high resolution three dimensional image of the object.

Preferably, the tactile image mapper also comprises a pressure regulator and transducer for varying and measuring the fluid pressure within the vessel thereby varying the stiffness of the membrane. By varying the pressures, the degree to which the membrane resists deformation and the amount that it is deformed may be varied or modulated. As will be more apparent hereinafter, the resolution of the image created is dependent solely on the resolution of the video camera, i.e., the number of pixels in the camera imaging system, and not upon the number of capacitors or other sensors responsive to pressure from the object to be mapped, which typifies the prior art arrangements.

BRIEF DESCRIPTION OF THE DRAWINGS

The accompanying drawings, which are incorporated in, and form a part of, the specification, illustrate a preferred embodiment of the present invention and, together with the description, serve to illustrate and explain the principles of the invention. In the drawings.

DETAILED DESCRIPTION

Reference will now be made in detail to the preferred embodiment of the invention, an example of which is illustrated in the accompanying drawings.

Figure 1:
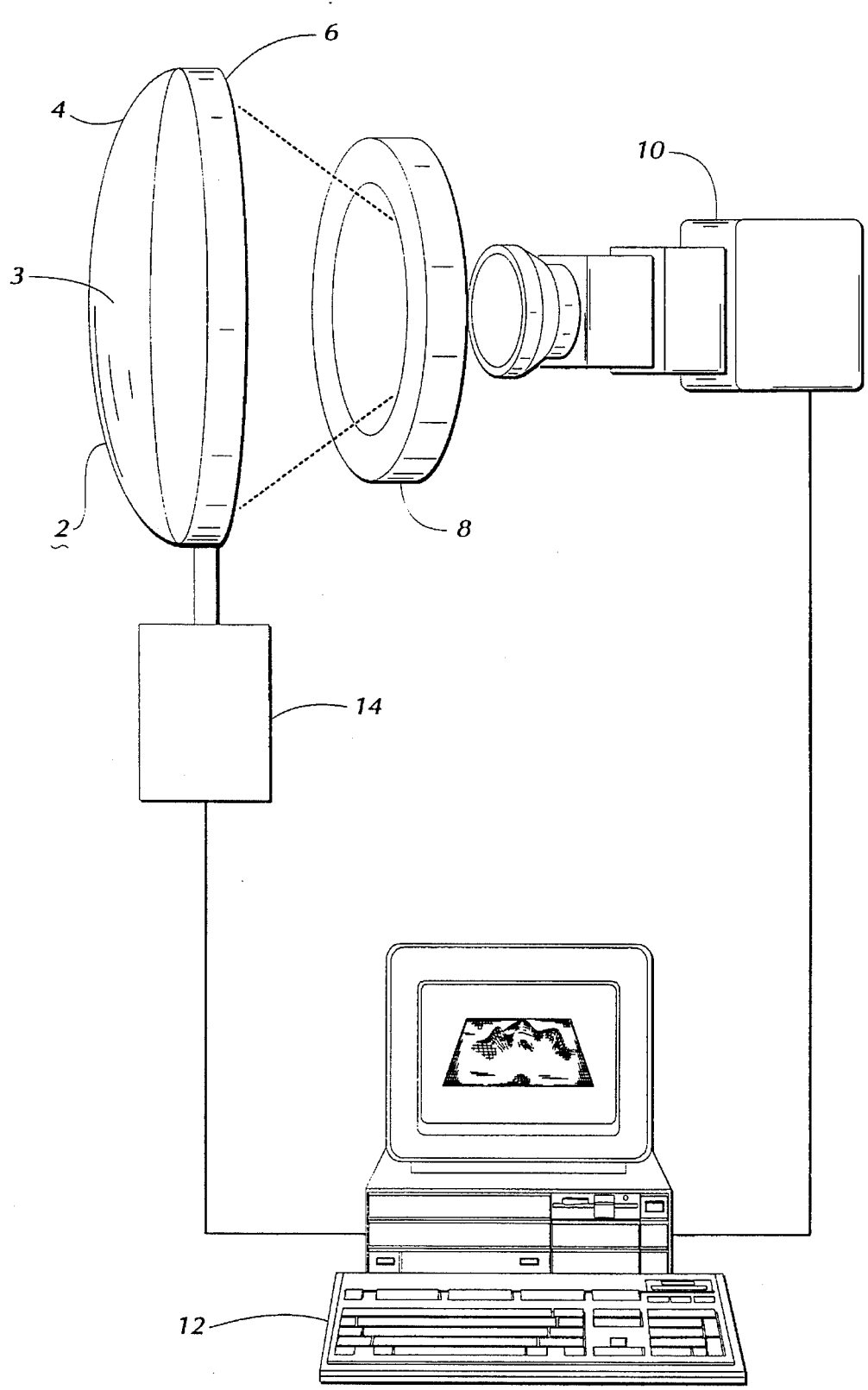
FIG. 1 is a diagrammatic partially perspective view of a tactile image mapper according to an illustrative embodiment of the invention.

With reference to FIG. 1, a tactile image mapper according to the invention comprises a vessel 2 that has a thin deformable membrane 4 on one side and a clear face plate 6 on the other side, thus defining an interior enclosed space 3. Membrane 4 is preferably opaque and reflecting, and can be solid white, for example. The space 3 of vessel 2 is filled with a light attenuating material, which is preferably an optically dense but not opaque liquid, such as, for example, ink. Other materials that have low optical dispersion yet high extinction may alternatively be used. A ring illuminator 8, which may be any one of a number of such light sources known in the art, illuminates the back side or the rear or interior surface of the deformable membrane 4 and a video camera 10 captures light reflected therefrom. The video camera observes the reflected light from the back side of membrane 4, which is modified by travelling different distances through the attenuating material, and generates video signals therefrom. The video signals generated by the video camera 10 are supplied to a microcomputer 12 for processing.

Under the control of the microcomputer 12, a pressure transducer and regulator 14 senses the pressure within the space 3 and varies the pressure of the optically dense liquid inside the vessel 2 to a predetermined pressure. The pressure is preferably varied and measured to a predetermined pressure so that differences in the image of the object can be detected from subsequent images of the object taken at the same pressure. Also, by varying the pressure within the vessel 2 to any of a plurality of predetermined pressures, the tactile image mapper can regulate the extent to which the topographical features of the object project into the vessel 2 and can thereby vary the depth the image depicts.

Figure 2:
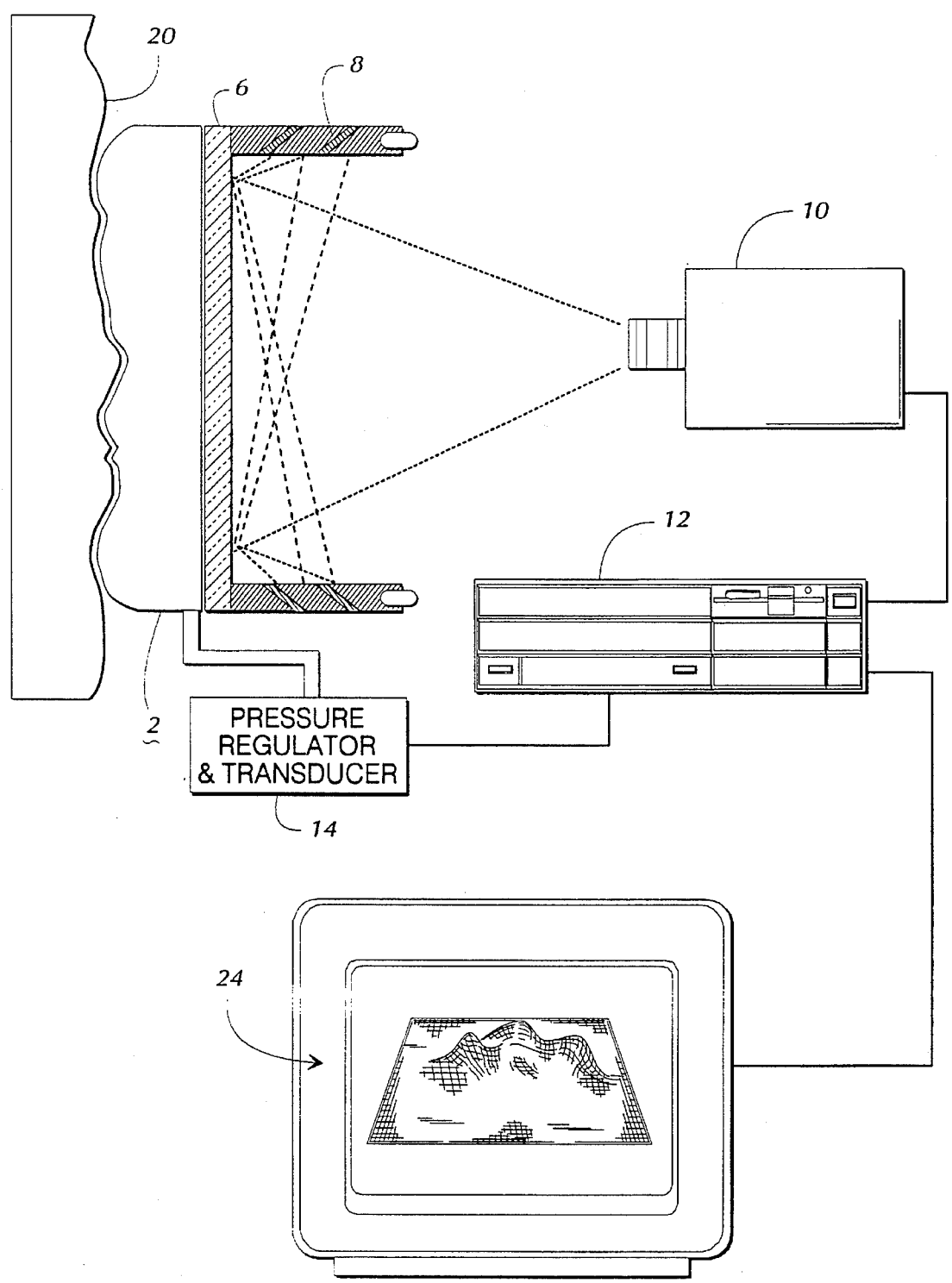
FIG. 2 is a more detailed diagrammatic view of the tactile image mapper of FIG. 1.

As shown in more detail in FIG. 2, during operation of the tactile image mapper, the pressure of the optically dense liquid inside the vessel 2 is measured and may be varied by the pressure regulator and transducer 14 so as to cause the deformable membrane 4 to conform to the shape of an object 20. When the pressure inside the vessel 2 is varied from a higher pressure to a lower pressure, protrusions on the surface of the object 20 may be brought further into the vessel 2 and closer to the face plate 6 which results in less light attenuation for light reflected from the protrusions compared to, for example, immediately adjacent areas. As a result, images of the object 20 may be mapped at varying depths by simply varying the pressure with the pressure regulator 14.

The ring illuminator 8 is comprised of a plurality of lights and mirrors and uniformly illuminates the back side of the deformable membrane 4. The reflections off of the back side of the membrane 4 are detected by the video camera 10, which is preferably a CCD video camera 10. While the preferred embodiment uses a video camera 10 as a separate and distinct item, it should be understood that appropriate optical lenses, a CCD, and other components of the camera 10 may be incorporated with the vessel 2 and ring illuminator 8 to form a single integrated apparatus.

The video signal from the video camera 10 is supplied to microcomputer 12 which has a frame grabber for isolating a single frame of the video signal. The microcomputer 12 reconstructs a topography of the object based upon the intensity of light at the various points throughout the image. Because the vessel 2 is filled with a light attenuating material, points in the image that have relatively high intensities where the optical paths in the fluid are relatively short with little light attenuation, are the result of large protrusions on the surface of the object 20 whereas points in the image that have relatively low intensities, corresponding to longer paths and hence higher attenuation, are the result of low areas on the surface of the object 20. By analyzing the intensity of light at each point within the image, the microcomputer 12 can produce a three dimensional image of the object 20 as shown at 24. As the processing of the video signal by the microcomputer 12 is within the capability of one of ordinary skill in the programming art, a detailed description of the process is believed to be unnecessary.

Figure 3A:
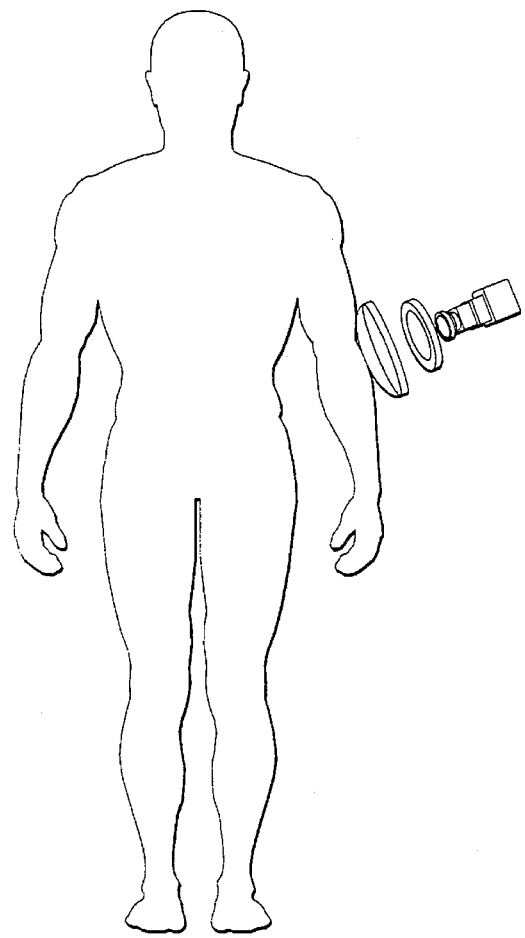
FIG. 3(A) illustrates a medical application of the tactile image mapper.

The tactile image mapper of the invention may be used in various environments. As an example, FIG. 3(A) depicts the tactile image mapper in a medical application where it may be used to capture a calibrated series of "palpation images" of a superficial or subcutaneous structure at preset pressures. By comparing the reconstructed image with those images reconstructed at other visits, a physician can accurately document and track the progress of the patient's problem. For instance, the physician can objectively track the size or shape of a growth or anomaly, such as one from skin cancer or a nodule under the skin, by comparing successively mapped images, thereby making it less important for the physician to perform a manual palpation or to rely upon the physician's memory.

Figure 3B:
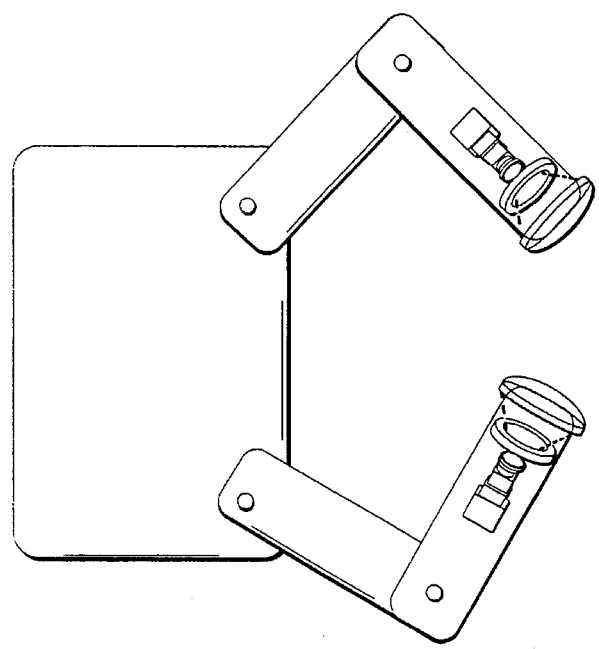
FIG. 3(B) illustrates an industrial application of the tactile image mapper.

As shown in FIG. 3(B), another possible application of the tactile image mapper is in the field of robotics. More specifically, the tactile image mapper may be placed in end effectors at the end of a mechanical hand to determine detailed characteristics of an object. These detailed characteristics include the determination of size, shape, texture, and hardness of an object grasped by the mechanical hand. By using the tactile image mapper in robotics, the end-effectors would have the capability of identifying an object as well as determining the position of the object and whether the object might be slipping from the robot's grasp.

Consequently, when robotics equipped with the tactile image mapper are used to assist in a manufacturing process, parts delivered to the end-effectors need not be precisely positioned as the end-effectors can now determine the position of the part and modify operations accordingly. Also, whereas before typically only a single type of part could be handled by the robotics, the end-effectors equipped with the tactile image mapper of the invention can identify the part and can therefore modify operations according to the type of part.

Figure 4A:
FIGS. 4(A),(B), and (C) are images reconstructed by a prototype tactile image mapper of a doll's head, a key, and a finger, respectively.
Figure 4B:
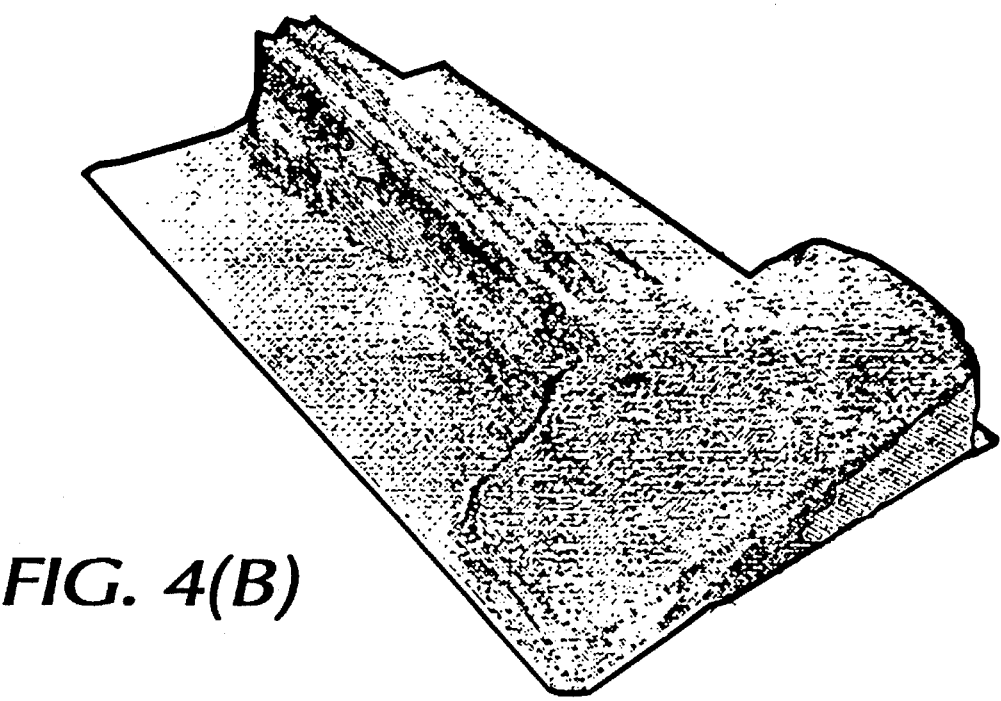
Figure 4C:
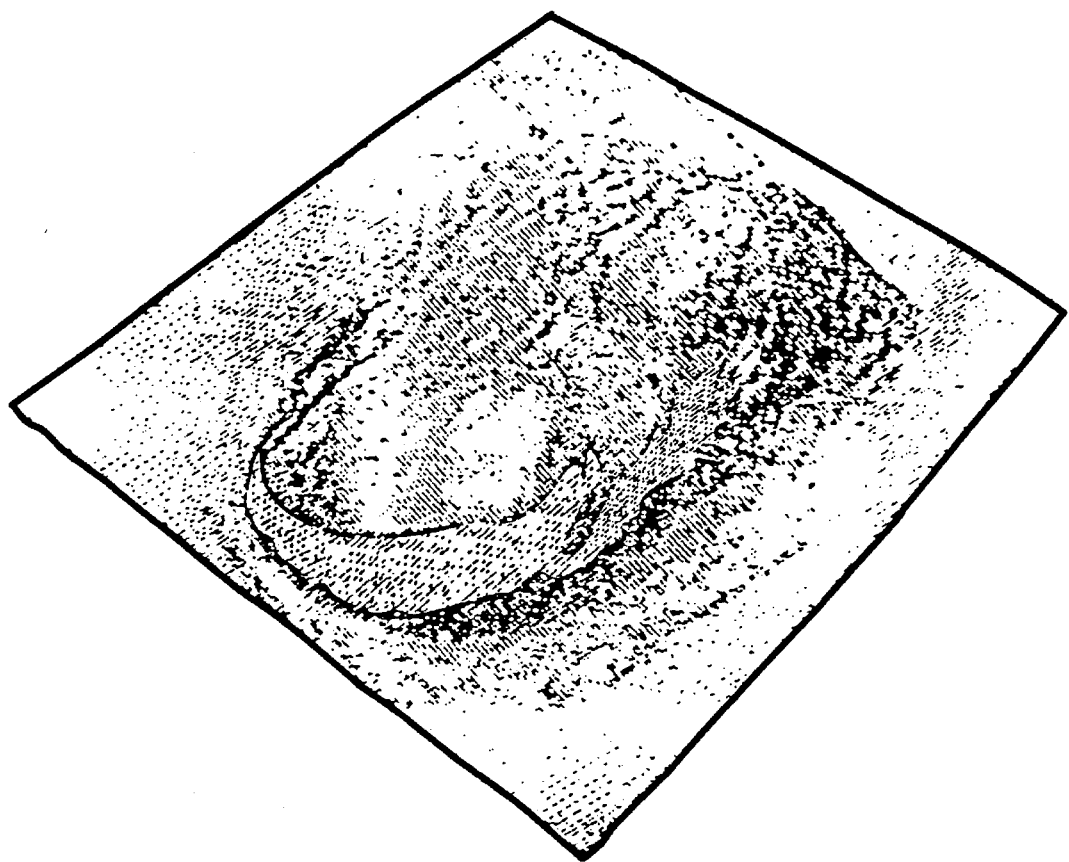

FIGS. 4(A), 4(B), and 4(C) respectively illustrate the topographies of a doll's head, a key, and a finger captured by the tactile image mapper. As is apparent from these figures, the tactile image mapper of the invention generates high resolution topographical images of an object.

The foregoing description of the preferred embodiment of the invention has been presented for purposes of illustrating the features and principles thereof. It is not intended to be exhaustive or to limit the invention to the precise form disclosed. Many modifications and variations are possible in light of the above teaching. For example, the fluid may be replaced with a clear, low optical dispersion plastic with soft, pliable physical properties. During its manufacture, the plastic would be mixed with an optically attenuating dye to provide the same tactile/optical characteristics as in the previously described embodiment. The plastic would then be molded into a thin layer backed by a rigid clear faceplate on one side and an opaque white coating on the other. This assembly would be used in the same illumination and video imaging scenario as previously described. The embodiment was chosen and described in order to explain the principles of the invention and its practical application; various other possible embodiments with various modifications as are suited to the particular use are also contemplated and fall within the scope of the present invention.

I claim:

1. An imaging system for producing a high resolution topographic representation of an object, comprising:

deformable means for deforming to at least a portion of a shape of an object in contact therewith, said deformable means having a light reflecting surface;

means for detecting reflections from said reflecting surface and for converting the detected reflections into data signals;

light modifying means between said reflecting surface and said detecting means for varying the intensity of the reflections in accordance with a deformation of said deforming means; and means for processing said data signals to produce said high resolution image of said object.

2. The system as set forth in claim 1, wherein said means for detecting said reflections comprises a video camera.

3. The system as set forth in claim 1, further comprising means for illuminating said light reflecting surface.

4. The system as set forth in claim 3, wherein said illuminating means comprises a ring illuminator for uniformly illuminating said reflecting surface of said deformable means.

5. The system as set forth in claim 1, further comprising means for regulating the resistance to deformation of said deformable means.

6. The system as set forth in claim 1, wherein said data signals comprise video signals.

7. The system as set forth in claim 1, wherein said light modifying means comprises a light attenuating material for attenuating said reflections.

8. The system as set forth in claim 7, wherein said light attenuating material comprises ink.

9. A tactile image mapper, comprising:

a vessel for holding a light attenuating material and having a deformable membrane for deforming to a shape of an object, said membrane forming one side of said vessel and a clear transparent plate forming a second side of said vessel opposite said one side;

an illuminator for illuminating an inside reflective surface of said deformable membrane;

a camera for detecting reflections from said inside surface of said deformable membrane and for generating a video signal; and a processor for capturing a single frame of said video signal and for reconstructing a high resolution image of said object.

10. The tactile image mapper as set forth in claim 9, further comprising a pressure regulator and transducer for varying and measuring a pressure of said light attenuating material to a preset pressure.

11. The tactile image mapper as set forth in claim 10, wherein a plurality of high resolution images of said object are obtained at a respective plurality of different preset pressures.

12. The tactile image mapper as set forth in claim 9, wherein said illuminator comprises a ring illuminator for uniformly illuminating said inside surface of said deformable membrane.

13. The tactile image mapper as set forth in claim 9, wherein said light attenuating material comprises ink.

14. A method for producing a high resolution image of an object, comprising the steps of:

placing one side of a deformable membrane in contact with said object and deforming said membrane to a shape of said object;

illuminating a reflective side of said membrane, said reflective side being opposite said one side;

modifying light reflected from said reflective side in accordance with a deformation of said deformable membrane;

detecting reflections from said reflective side of said membrane and converting said reflections into data signals; and processing said data signals to produce said high resolution image of said object.

15. The method as set forth in claim 14, wherein said step of deforming comprises the step of varying the resistance to deformation of the membrane.

16. The method as set forth in claim 15, wherein the step of varying the resistance of the membrane comprises setting the stiffness of the membrane to any one of a plurality of pre-determined levels.

17. The method as set forth in claim 14, wherein said step of modifying light reflected from said reflective side comprises the step of passing said reflected light through a light attenuating material.

\* \* \* \* \*